No. 733,634. PATENTED JULY 14, 1903.
C. E. DUNGAN & C. F. STELLE.
ROLLER CULTIVATOR AND GRADER.
APPLICATION FILED DEC. 20, 1902.
NO MODEL. 4 SHEETS—SHEET 1.

WITNESSES:
Dow W. Vorhies.
Stella Snider.

INVENTORS:
Clarence E. Dungan,
Clifford F. Stelle,
BY E. T. Silvius,
ATTORNEY.

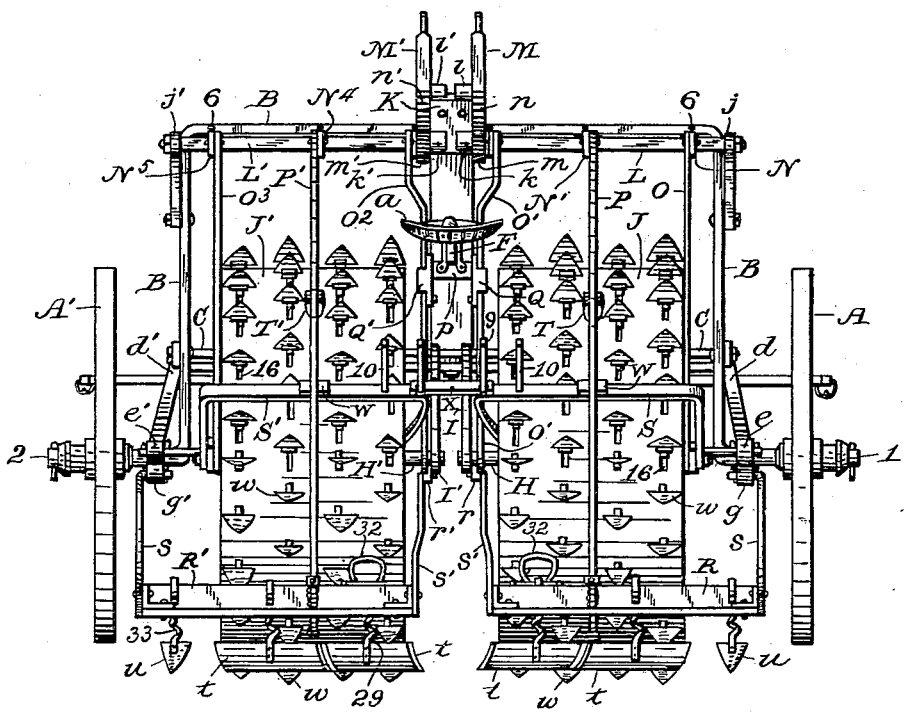
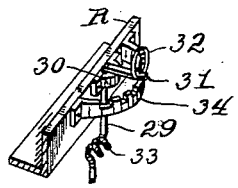
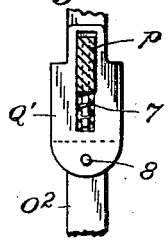
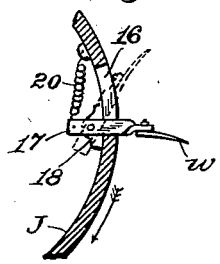
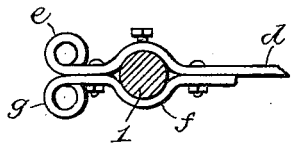

No. 733,634. PATENTED JULY 14, 1903.
C. E. DUNGAN & C. F. STELLE.
ROLLER CULTIVATOR AND GRADER.
APPLICATION FILED DEC. 20, 1902.
NO MODEL. 4 SHEETS—SHEET 3.
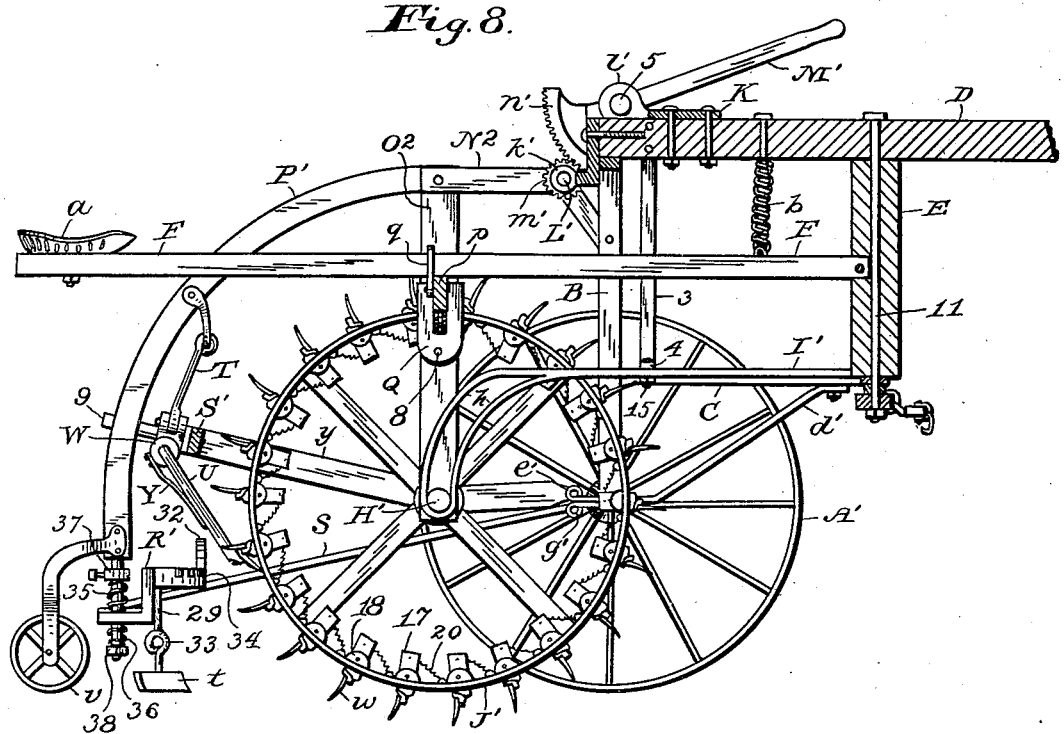
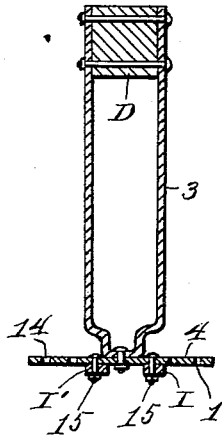
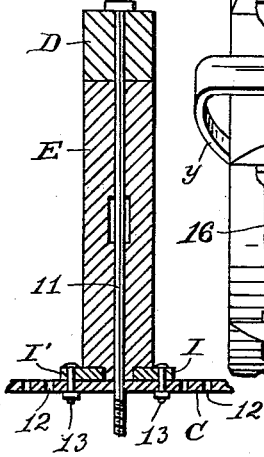
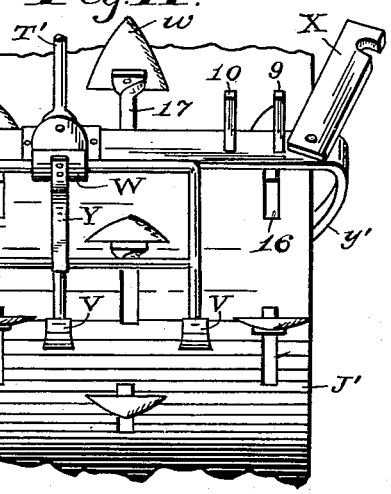
WITNESSES:
Dow W. Vorhies.
Stella Snider.
INVENTORS:
Clarence E. Dungan,
Clifford F. Stelle,
BY
E. F. Silvius,
ATTORNEY.

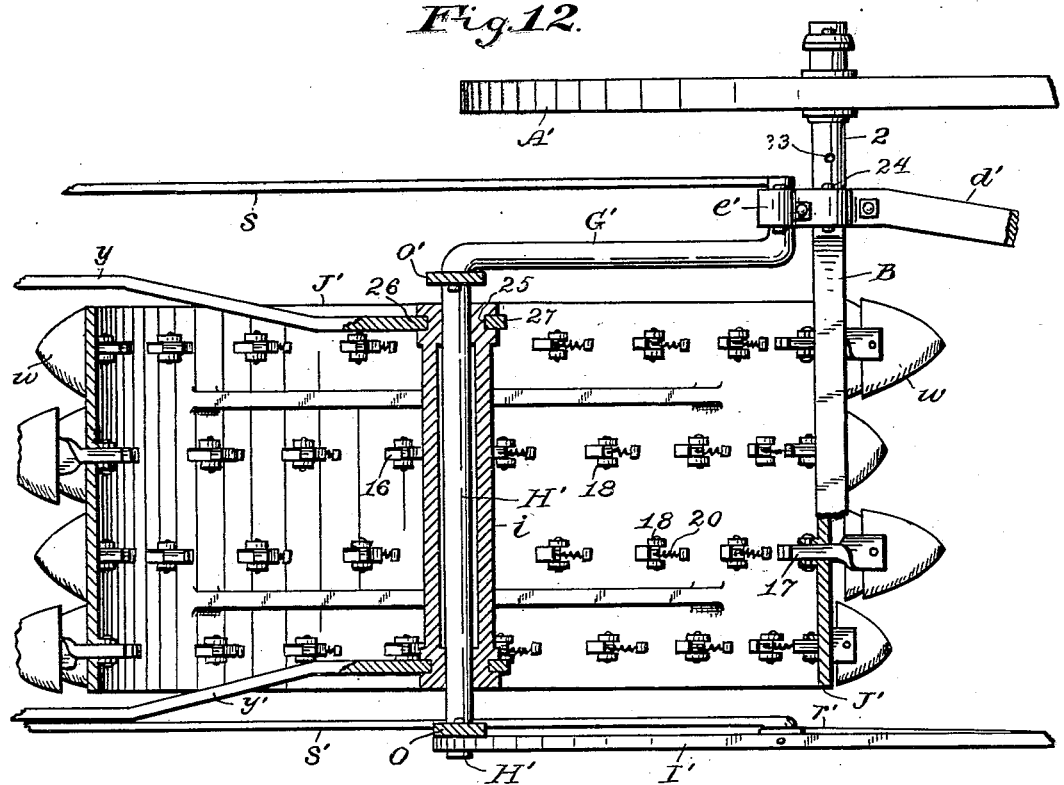
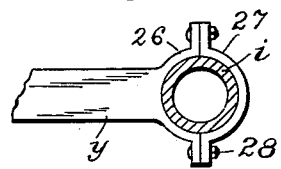
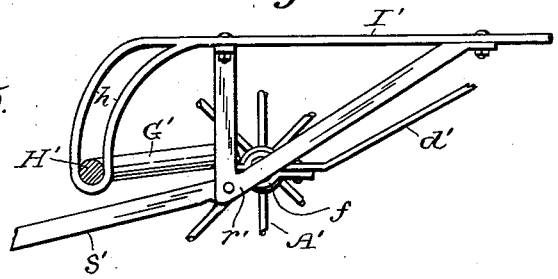
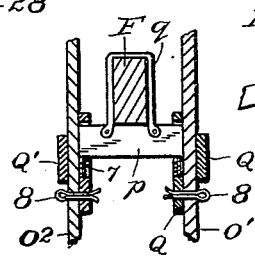

No. 733,634. Patented July 14, 1903.

UNITED STATES PATENT OFFICE.

CLARENCE E. DUNGAN AND CLIFFORD F. STELLE, OF CONNERSVILLE, INDIANA.

ROLLER CULTIVATOR AND GRADER.

SPECIFICATION forming part of Letters Patent No. 733,634, dated July 14, 1903.

Application filed December 20, 1902. Serial No. 135,951. (No model.)

*To all whom it may concern:*

Be it known that we, CLARENCE E. DUNGAN and CLIFFORD F. STELLE, citizens of the United States, residing at Connersville, in the county of Fayette and State of Indiana, have invented new and useful Improvements in Roller Cultivators and Graders; and we do declare the following to be a full, clear, and exact description of the invention, reference being had to the accompanying drawings, and to the letters and figures of reference marked thereon, which form a part of this specification.

This invention relates to agricultural implements that are designed to cultivate growing crops, particularly of corn, the invention having reference particularly to implements in each of which are combined rollers, cultivators or shovels, and graders for leveling the ground after having been rolled and loosened.

The object of the invention is to provide a combination improved implement of the character above described and to improve the component parts of implements of this character to the end that they may be cheaply produced and be advantageous, economical, and durable in use.

With the above-mentioned and minor objects in view the invention consists in rollers having movable shovels, the rollers being adapted to be adjusted both laterally and vertically, and in adjustable graders; and the invention consists, further, in the novel parts and in the novel combination and arrangement of parts, as hereinafter particularly described, and pointed out in the appended claims.

Figure 1:
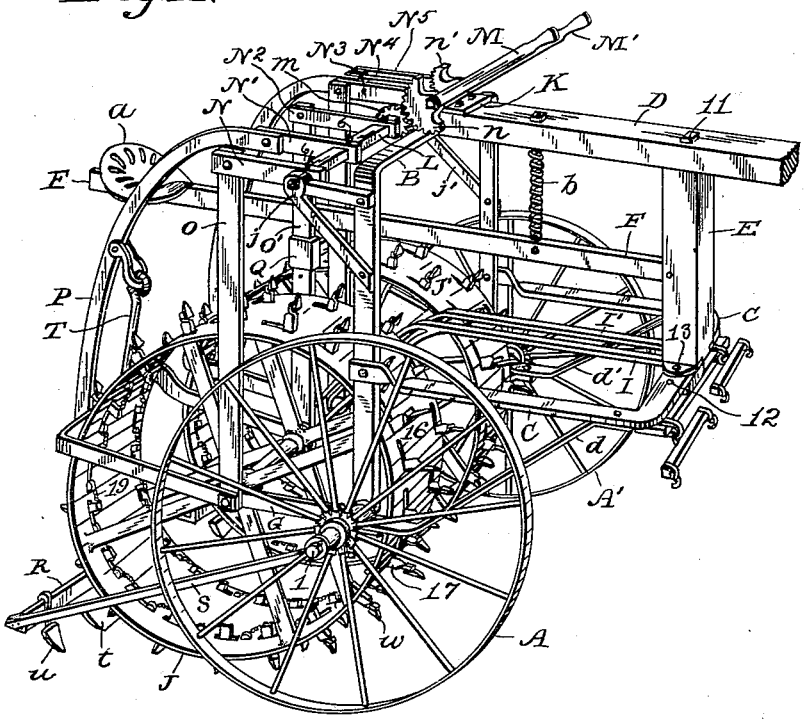
Figure 2:
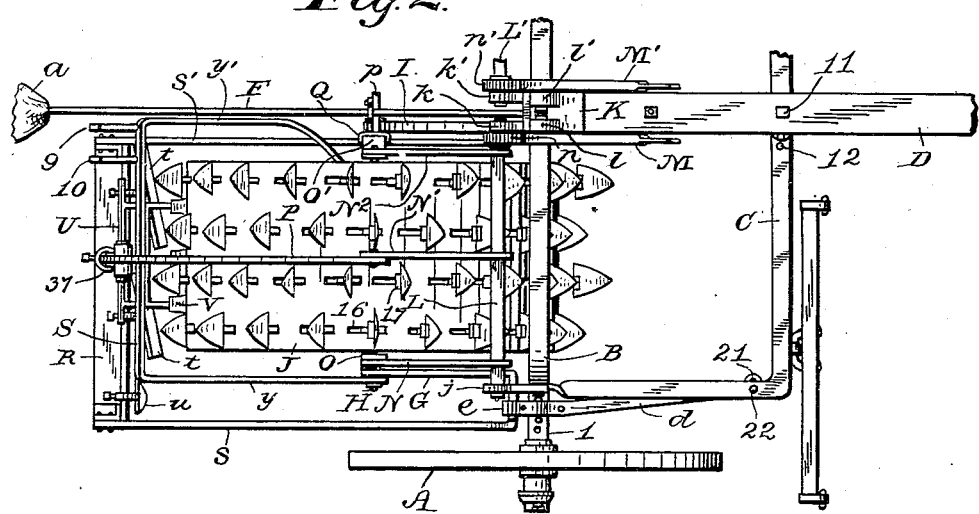

Referring to the drawings, Figure 1 is a perspective representation of an implement embodying the invention, minor parts being omitted to avoid confusion; Fig. 2, a top plan view of half of the implement, minor parts also being omitted therefrom; Fig. 3, a rear elevation view showing the principal elements of the implement; Figs. 4, 5, 6, and 7, fragmentary detail views showing the preferred forms of various parts; Fig. 8, a central vertical longitudinal sectional view showing portions of the implement in side elevation; Figs. 9, 10, and 11, fragmentary detail views of various parts; Fig. 12, a fragmentary top plan view in which parts are shown in horizontal section; and Figs. 13, 14, and 15, fragmentary detail views elaborating parts that may be obscure in other figures.

Similar reference characters in the drawings designate like parts.

Broadly considered the implement comprises a pair of carrying-wheels A A', in which is mounted an arch B of suitable form having axles 1 and 2. A horizontally-disposed frame C is secured to the arch and extends forwardly thereof. A pole D is secured to the top of the arch and by means of a post E is connected with the frame C, so that the arch, the frame, the rear portion of the pole and the post together comprise the general framework of the implement. A seat-bar F is connected to the general framework, preferably to the post E, and extends rearwardly beyond the arch B, a seat $a$ being attached thereto. The rear portion of the seat-bar is supported by a spring $b$, which may be situated as far back as the arch and attached to the pole D or other suitable support. The framework is provided with inclined braces $d$ $d'$, attached adjustably to the axles 1 and 2 and also to the frame C. Each brace is provided with an eye $e$ or $e'$ at the rear of the axle, and clamps $f$ are employed for attaching the braces to the axles, the clamps having eyes $g$ $g'$ at the rear of the axles below the other eyes. Connected to the eyes $e$ $e'$ are arms G G', adapted to move radially in vertical planes, and they may also be designed to move laterally in the eyes, if desired. Axle-shafts H H' have each an end thereof connected to the arms G G', the shafts extending laterally from the arms toward each other. Adjustable frame members I I' are attached to the general framework, preferably to the frame C, and are suitably braced, as by hangers 3, attached to the pole D and to a cross-bar 4, adjustably attached to the members I I'. The rear ends of the members I I' are curved downwardly and have guide-openings $h$, in which are movably mounted the adjacent ends of the shafts H H'. Rollers J J' are mounted on the shafts rotatively and may be adapted to move along the shafts, the hubs $i$ being in such case shorter than the shafts.

Brackets $j$ $j'$ are attached to opposite sides of the arch B at the top thereof, and a bracket K, having shaft-bearings $k$ $k'$ and $l$ $l'$, is secured to the rear portion of the pole D. Rock-shafts L L' are mounted in the brackets $j$ $j'$ and the bearings $k$ $k'$ and are provided with toothed wheels $m$ $m'$ at their adjacent ends near the bearings $k$ $k'$. Shafts 5 are mounted in the bearings $l$ $l'$, and on the shafts are mounted operating-levers M M', having toothed segments $n$ $n'$, engaging the wheels $m$ $m'$. Arms N N' N$^2$ N$^3$ N$^4$ N$^5$ are movably attached to the shafts L L', so as to be adjustable laterally on the shafts, as by means of set-screws 6, and links O O' O$^2$ O$^3$ are pivoted to four of the arms and connected to the shafts H H', or substantially thereto, for lifting the rollers J J'. Outriggers P P' are pivoted to the arms N' N$^4$, one between each pair of links, and extend downwardly at the rear of the rollers.

Brackets Q Q' are movably attached to the links O' O$^2$ and have springs 7, upon which are supported a cross-bar $p$, upon which rests the seat-bar F. A strap $q$ is secured to the bar $p$ and extends over the bar F, holding the two bars together, but permitting end movements of the bar F. Pins 8 normally prevent the brackets Q Q' from sliding down the links on which they are mounted.

Brackets $r$ $r'$ are secured to the members I I' and depend therefrom. Coupling-bars $s$ are pivotally connected to the eyes $g$ $g'$, and like bars $s'$ are likewise connected to the brackets $r$ $r'$, extending rearwardly, the coupling-bars being in pairs and all pivoted in the same plane, so that they have substantially an identical pivotal axis. A beam R is attached to one pair of coupling-bars and a beam R' is attached to the other pair. The beams carry graders $t$ and also cultivator-shovels $u$, the latter being situated beyond the outer sides of the rollers and the graders behind the rollers. The beams R R' are also connected with the outriggers P P', and the latter may be provided each with a wheel $v$. The rollers J J' are provided with cultivator-shovels $w$ for loosening and working the ground.

Shifting bars S S' are provided for manually moving the rollers J J' laterally while in motion, and they have limbs $y$ $y'$ reaching to the roller-hubs or their shafts. It may be designed so that the limbs of the shifting bars may be attached to the shafts of the rollers, as in Figs. 2 and 3, so as to move the arms G G' laterally in the eyes $e$ $e'$, or, as shown in Fig. 12 particularly, the limbs may be connected to the hubs $i$, so that the rollers may be moved along their shafts, the ends of the limbs being carried by the hubs. The shifting bars are carried by means of links T T', connected with the outriggers P P', and are provided with projections 9 and 10 within reach of the driver's knees. The bars S S' usually carry frames U, to which are attached scrapers V, which are pressed against the rollers J J' by springs Y, the scraper-frames being connected pivotally with their supports by means of a coupling-head W, which may serve to connect the shifting bars to the links T T'. A coupler X is usually provided by which to couple the two shifting bars together when desired and is permanently connected movably to either one of the bars S or S'.

Specifically, in construction the arch B and axles 1 and 2 may be formed of a single piece of iron. The parts C, D, and E are secured together by a bolt 11. The arms G G' may be formed integrally with the roller-shafts or separately, as will be apparent, and each one has a bent end extending through an eye $e$ or $e'$. The members I I' being designed to be disconnected from the frame C and spread apart, if so desired, the frame C is provided with extra bolt-holes 12 to receive the bolts 13 when transferred, which secure the members to the part C. Also the cross-bar 4 has extra bolt-holes 14 to receive the securing-bolts 15 when the members I I' are moved.

The rollers J and J' may have any suitable number of shovels projecting from the peripheries thereof, and preferably the shovels are mounted elastically, so as to guard against injury in case they are forced against stones or roots. The rollers have slots 16, through which the shanks 17 of the shovels extend, the shanks being pivoted to ears 18 at the inner sides of the shells of the rollers, which are hollow. The shovels are provided either with compressed springs 19, as in Fig. 1, or with strained springs 20, as in Figs. 8 and 12. The braces $d$ $d'$ being designed to be moved laterally along the axles 1 and 2, the braces have slots 21, through which the securing-bolts 22 extend, and the axles may be provided with gage-holes 23 and pins 24. The draft-rigging, as a doubletree, may be connected to the bolt 11.

Usually the ends of each roller-hub $i$ have each a groove 25, and the limbs $y$ $y'$ have forks 26 fitting in the grooves, straps 27 being secured by bolts 28 to the forks and also fitting in the grooves, thus retaining the forks in the grooves, and by this means the hub may rotate in the strapped forks and may thereby be moved along its shaft H or H'.

When it is designed so that the rollers may move laterally on their shafts, as above described, by means of the shifting bars S S', it may not be necessary that the shafts be mounted so as to be moved by the shifting-bars, but may be so mounted, if desired, in which case the arms G G' will be movable laterally, the bent ends of the arms being movable endwise in the eyes $e$ $e'$, and the shafts H H' will be movable endwise in their curved guides between the rollers. It will be understood that when the machine is in operation the jolting produced by the uneven ground will tend to cause the rollers to move laterally with respect to the carrying-wheels and such movements may be controlled by means of the driver's knees and the shifting bars.

Each beam R or R' is usually provided with two graders t, one of which may be movable, so as to change its angle, in which case its shank 29 is mounted rotatively in a bearing 30 and provided with an arm 31, having a foot-loop 32, and the shanks preferably are coiled to form springs 33. The arms 31 engage notched quadrants 34. The beams are usually elastically supported by means of springs 35 and 36 and adjusting-collars 37 and nuts 38, fitted to the extremities of the outriggers P P', which extend through apertures in the beams. The shanks of the shovels u also preferably have the springs 33.

In practical use the driver will ride upon the seat a, placing his feet in the loops 32 and his legs between the pairs of projections 9 and 10, his weight being carried by the rollers J J'. By moving his knees sidewise the rollers may be caused to travel closer or farther apart, as may be desired, the row of corn being between the rollers, the adjustment being limited, however. To change the angle of the movable graders, the feet should be moved laterally, carrying the loops with them. A separate adjustment of the rollers and coöperating parts may be obtained by moving laterally the members I I' and the arms G G' and shafts H H', also the braces d d' and the arms N N² N³ N⁵ when the machine is at rest. By operating the levers M M' the rollers and connections may be raised, transferring all or part of their weights upon the carrying-wheels A A', the latter carrying all the parts when moving on roads. When all are thus carried, the brackets Q Q' will first be loosened by removing the pins 8 and slide down the links or lifters O' O², the spring b then supporting the bar F. The scrapers V will prevent adherence of soil to the rollers between the shovels. As the rollers move upon the ground the shovels will penetrate the soil and will normally be held in proper positions by their springs.

Having thus described the invention, what we claim as new is—

1. A roller-cultivator including carrying-wheels, a frame mounted on the wheels, rollers having shovels, arms connected with the frame and also with the roller-axle shafts, rock-shafts mounted on the frame and having lifting-arms attached thereto, operating-levers for the rock-shafts, links connected with the axle-shafts of the rollers and also with the lifting-arms, a seat-bar connected with the frame and also with the links, and a seat attached to the seat-bar.

2. A roller-cultivator including carrying-wheels, a frame, an arch forming parts of the frame and mounted in the wheels, eyes attached to the arch, arms pivoted in the eyes, members attached to the frame and having curved slots therein, axle-shafts attached to the arms and also having bearings in the curved slots, lifting-arms having shafts mounted on the frame, lifting-links connected to the lifting-arms and with the axle-shafts, rollers having movable shovels and mounted on the axle-shafts, and means for operating the lifting-arms.

3. A roller-cultivator including carrying-wheels, axle-shafts having arms pivoted to the frame and extending rearwardly therefrom, rollers mounted on the axle-shafts and having slots in the rims thereof, pivots mounted at the inner sides of the rims at the slots, shovels having shanks extending through the slots and mounted on the pivots, lugs attached to the rims, springs connected with the lugs and also with the shanks, rock-shafts mounted on the frame, lifting-arms attached to the rock-shafts, links connected to the lifting-arms and with the axle-shafts, and means whereby the rock-shafts may be operated.

4. A roller cultivator and grader including carrying-wheels, a frame mounted on the wheels, rollers having shovels, arms connected with the frame and also with the rollers, rotative shafts mounted on the frame, means for operating the rotative shafts, lifting-arms attached to the rotative shafts and having links connected with the rollers, arms attached to the rotative shafts and having outriggers extending behind the rollers, beams connected with the outriggers and having graders and shovels attached thereto, and shifting bars connected with the outriggers and also with the rollers.

5. A roller-cultivator including carrying-wheels, a frame mounted on the wheels, rollers mounted behind the frame and having shovels pivoted thereto, means for lifting the rollers, outriggers mounted behind the rollers, means for elevating the outriggers with the rollers, beams connected with the outriggers, graders and shovels mounted on the beams, shifting bars connected with the rollers, scrapers supported by the shifting bars, and links connecting the shifting bars with the outriggers.

6. A roller cultivator and grader including carrying-wheels, a frame, rollers having shovels, outriggers extending rearwardly beyond the rollers, means whereby the rollers and the outriggers may be elevated together, beams carried by the outriggers, shovels having spring-shanks supported by the beams, and graders having spring-shanks movably supported by the beams.

7. A roller-cultivator including carrying-wheels, a frame mounted on the wheels, rollers having shovels projecting therefrom, arms pivoted to the frame, members attached to the frame and having curved guide-openings therein, roller-shafts extending through the roller-hubs and attached to the arms and also movably mounted in the guide-openings, and lifters connected with the frame and also with the roller-shafts.

8. A roller-cultivator including carrying-wheels, a frame mounted on the wheels, arms pivoted to the frame, curved guides supported by the frame, roller-shafts mounted in the arms and in the curved guides, rollers mounted on the roller-shafts, links connected to the roller-shafts, lifting-arms connected to the links, means for operating the lifting-arms, beams mounted behind the rollers, shovels mounted on the beams, adjustable graders mounted on the beams, and means whereby the beams may be lifted with the rollers.

9. In a roller-cultivator, the combination with carrying-wheels and an arch mounted in the wheels, of a pole attached to the arch, a frame member attached to the arch and extending below the pole, braces attached to the frame member and also connected with the lower portions of the arch, a post extending from the frame member to the pole and secured thereto, a seat-bar connected with the post, a spring connected with the seat-bar and also with the pole, cultivator-rollers having axle-shafts and operatively connected with the frame, lifting-arms mounted on the frame, link-bars connected with the lifting-arms and also with the axle-shafts and having movable brackets connected with the seat-bar, substantially as set forth.

10. In a roller cultivator and grader, the combination with a frame and carrying-wheels therefor, of cultivator-rollers mounted in the frame, outriggers connected operatively with the frame and extending over and behind the rollers, beams connected with the outriggers and having notched quadrants, graders having shanks mounted rotatively on the beams and provided with arms engaging the quadrants and loops attached to the arms, and a seat supported substantially by the rollers and the frame, substantially as set forth.

In testimony whereof we affix our signatures in presence of two witnesses.

CLARENCE E. DUNGAN.
CLIFFORD F. STELLE.

Witnesses:
W. E. JEFFREY,
E. W. JEFFREY.